United States Patent [19]

Gozdowiak

[11] Patent Number: 4,838,796

[45] Date of Patent: Jun. 13, 1989

[54] MULTIPLE DIAL METER READING DEVELOPMENT APPARATUS AND METHOD

[76] Inventor: Gregory J. Gozdowiak, N101 W16134 Santa Fe Dr., Germantown, Wis. 53022

[21] Appl. No.: 64,176

[22] Filed: Jun. 18, 1987

[51] Int. Cl.⁴ .............................................. G09B 19/00
[52] U.S. Cl. ..................................... 434/224; 434/323
[58] Field of Search ............... 434/219, 224, 304, 323; 364/483, 492, 493; 324/114, 115, 116

[56] References Cited

U.S. PATENT DOCUMENTS 3,364,599 1/1968 Polsky .................................. 434/304
4,301,508 11/1981 Anderson et al. ................... 362/492

FOREIGN PATENT DOCUMENTS 0049184 4/1982 European Pat. Off. ............ 434/323

*Primary Examiner*—James C. Yeung
*Assistant Examiner*—Noah Kamen

[57] ABSTRACT

A meter reader training apparatus includes a programmed microprocessor operable to sequentially display on a video display monitor or unit sets of rotary dials, each having the usual hour time marks, and may have a pointer located thereon to present output readings. The dials are presented in sets of 5 dials and the monitor is a black and white 3. A hand-held meter reader recording instrument is connected to the processor for inputting digits the trainee identified for numerical reading of each dial. The microprocessor compares the inserted digits with the actual digits. The processor has an output to the display unit and displays the proper number if an error is made. A printer is coupled to the processor to provide a printout of each executed sequence with a summary statement as to the length of a program, the errors created, the elapsed time and a presentation of each erroneous selected number with the correct digit adjacent the improper digit and the like. A complete route training system may include handling of field problems, such as special access, a broken meter or the like.

9 Claims, 2 Drawing Sheets

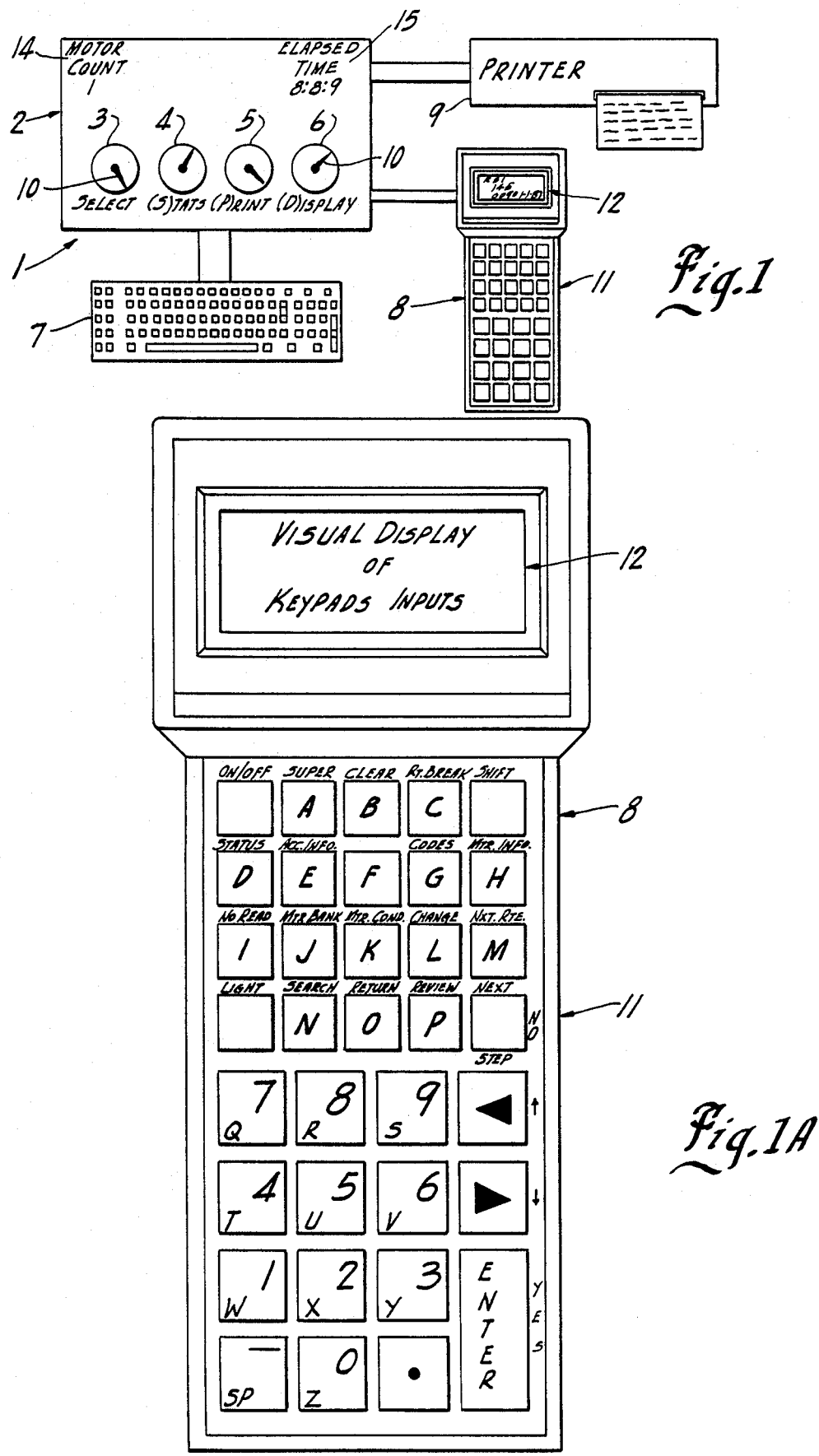

MULTIPLE DIAL METER READING DEVELOPMENT APPARATUS AND METHOD

BACKGROUND OF THE INVENTION

The present invention relates to a multiple dial meter reading training apparatus and method and particularly to such apparatus and method for training individuals to read multiple rotary dials and demand electric scales such as used in gas and electric meters, water meters and the like.

In the retail marketing and distribution of natural gas, electricity and like products, meters are connected at the entrance to the users system. The meters which have been used for many years include a plurality of rotary dial units for recording of the accumulated usage. Each dial provides a digit reading for a significant place in the meter readout. Conventionally, a rotating needle indicator rotates 360° for each full flow unit of usage, and thus moves from digit 0 through digit 9. A coupling mechanism between the several rotating indicators is such that each complete revolution of a given lesser significant number position dial corresponds to the next most significant digit dial moving by a factor of one in a clockwise and/or counter clockwise movement digit. The dial movement is in a clockwise and/or counter clockwise movement. A proportionate positioning of the indicator needle for each partial rotation of the preceding indicator needle is of course also established. Such readouts are conventionally and almost universally manually read by meter readers. Although any given error in one reading may well be corrected by a subsequent reading, errors are significant and troublesome. In particular, a customer may receive an unusually large billing for a given period because of an error in the meter reading. The customer normally complains, even though the customer may realize that correction will be made at a subsequent date.

The distributor of the product would of course also prefer to have totally accurate readings to maintain accurate recording of the actual product sold on the proper periodic basis.

Although extensive training programs have been provided, errors in meter reading are a common occurrence, particularly with more inexperienced readers. However, even the experienced reader may periodically include erroneous readings.

The greatest difficulty arises when a dial is at an approximate change-over position between numbers, and particularly from 9 to 0. Although the reader should be able to readily convert to the appropriate digit by reference to the associated preceding dial, errors frequently arise in the reading. The level of error of course indicates the necessity for further training.

With present training methods, it has been found that it is extremely difficult for personnel to totally grasp and become highly proficient in the meter reading. Further, even with personnel having the ability to reasonably follow and understand the procedures, proficiency is only obtained after a very significant time consuming and costly training program.

There is therefore a significant demand for a system to develop the skill of personnel in accurately reading the several interrelated dials of meters. The system should provide a more rapid and more efficient method for developing the skill of personnel in meter reading and also advantageously be used for periodic review by the meter readers.

SUMMARY OF THE PRESENT INVENTION

The present invention is particularly directed to a meter reading training system and apparatus for providing rapid and effective development of personnel for accurate, repeatable reading of multiple dial meters, and particularly to such a system permitting the effective self-training of meter reading personnel. Generally, in accordance with the teaching of the present invention, and display apparatus includes a programmed means which sequentially presents a plurality of interrelated dials in accordance with a standard meter readout to a meter reader in combination with input means permitting the reader operator or trainee to enter a reading into a response device.

In a particular feature of the present invention, the input means is a portable computerized meter reader instrument having an input keyboard constructed and corresponding to the actual instrument used by the meter reader in recording the meter readings made in the field. The instrument is specially programmed to interface with the display and the response device. A control logic in the response device compares the input with a proper reading, and provides indication to the reader whenever and wherever an error has been made. The response unit can provide for automatic sequential presenting of dial readings, with means for recording the correct or incorrect answers, the time of the total sequence, the number of meters read and other significant information for subsequent analysis and review by the reader and the supervisory personnel. An immediate response of the system permits the reader to carefully review the reading to note the comparison of the several dials and recognize the source of his error, the type of error made, and related information such as the monetary value associated with the errors made.

The present invention is particularly adapted to a computerized control system including a programmed processor means for selectively presenting the dial readings to the meter reader and for recording of the responses not only for immediate, but for subsequent overall analysis. The training system is particularly adapted to presentation and functioning in personal computers which are readily available with appropriate display, storage and printing units.

In a preferred embodiment of the invention, a programmed microprocessor is operable to sequentially display a multiple rotary dial readout having the usual time spaced increment marks on the individual dials and pointers located thereon to present output readings. The operator/reader actuates input keys of the hand held meter reader instrument or other microprocessor input keyboard for selecting and identifying the numerical reading of each of said dials. The microprocessor records the inserted digits and compares the selected digits with the actual digits. An output of the comparison is presented to the operator by display of the selected reading and display of the proper number directly associated with any erroneous number in the inserted reading. The microprocessor is set to present a number of different meter readings and records the total number presented along with the errors made during each presentation of the series of dial readouts. The circular numeric reading dials are organized in side-by-side relation with the digits 0-9 equicircumferentially displayed in accordance with the commercial meters which the operator/reader must read. In an alternate mode, the dials as presented include non-numeric equispaced markings on the dial and a rotating cooperative marking for establishing the readout of each dial. The readers thus must recognize the proper digit for each dial marking.

A printer is also coupled to the microprocessor, which can provide a printout of each executed sequence with a summary statement as to the length of program, the erorrs created, the elapsed time and a presentation of each erroneous selected number with the correct digit adjacent the improper digit.

Further, the processor is preferably provided with a trainee program development program through which a trainee program tailored to the particulars of a utility or other user's system, as well as the level of the trainee, can be created for each utility or other user. For example, the more experienced meter reader would generally have a program with a more difficult reading presentation so as to further develop the trainee's skills.

The system may also be developed to produce a complete route training system which involves development of the direct handling of field problems in addition to accurate reading of the meters in the field. In this aspect of the invention, the hand held reader instrument is connected as the input means and the program is set as a route sinulator to in essence present a series of identified meter and related problems which are often encountered in the field and require some action by the meter reader. For example, special access might be required, the meter may be broken or obviously operating improperly or the like. The system permits the on-site development of a training program script which can therefore be tailored to the particular utility system, including both general and particular problems encountered by meter readers. The system has an appropriate program for running of the specially developed script, with appropriate validating of all key entry data inputted from the hand held reader instrument. The program provides for storing of statistical results for each training sessions for producing of reports as to the results and progress of each trainee and the like.

The operator-reader trainee thus controls the development of the particular program sequence by both option selection and execution of the program. The essential instantaneous feedback and special prosecution of not only the error but the proper reading has been found to significantly increase the skill of the operator reader. The system is basically directly related to the actual problem the reader encounters, particularly with the hand-held microcomputer reader instrument, and is readily implemented at a reasonable cost with present day technology.

BRIEF DESCRIPTION OF THE DRAWINGS

The drawings furnished herewith generally illustrate the best mode presently contemplated for carrying out the invention.

In the drawings:

FIG. 1 is a simplified illustration of a system for self training of meter readers;

FIG. 1a is an enlarged view of a portable meter reading device specially constructed for use in the present invention;

DESCRIPTION OF THE ILLUSTRATED EMBODIMENT

Figure 1B:
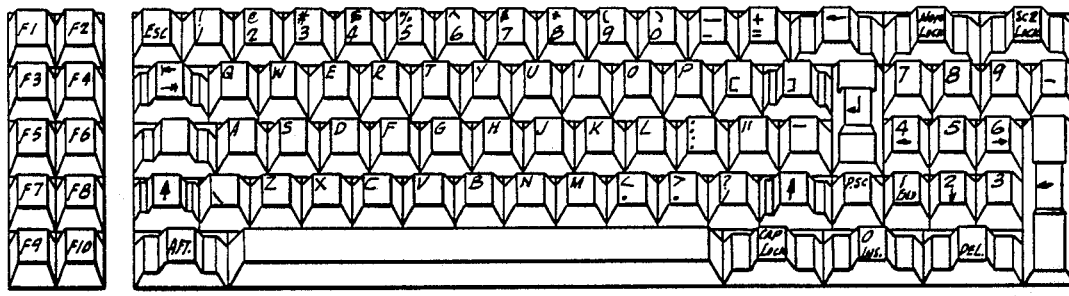
FIG. 1b is an enlarged view of a computer keyboard shown in FIG. 1.

The present invention is particularly directed to a microprocessor based training system using a program and microprocessor device 1 having a visual screen display 2. The device 1 is programmed to provide various displays corresponding to the series of meter dials 3, 4, 5 and 6 of an actual gas meter, not shown, for presentation to "meter reader" personnel. The personnel interacts with the presentation through the processor keyboard 7, or through a special hand held meter reading instrument 8 coupled to the processor, to produce a selected reading and introducing such reading into the microprocessor 1. The correct or incorrect answer which is inserted is analyzed and various appropriate actions undertaken, depending upon the particular selected program. Thus, as presently described, various degrees of difficulty may be presented to the personnel depending upon such personnel's ability and experience.

The hand-held reading instrument 8 is a modified known computer-based device presently used by meter readers for recording the readings of meters and for transmitting such recorded reading to a central station or office. In the present invention, the reading instrument 8 is particularly significant in that the trainee practices reading, and recording such reading, of the dial and demand scales with the same instrument and in the same manner as he will in the field. One example of an instrument, shown with an appropriate modified keyboard system for use herein, is the model 701E reader instrument manufactured and sold by Porta-Printer Systems, Inc. of Fargo, Fla. 33543 under its trademark "Porta-Processor". In the hand-held instrument, the number board or section 11 of the keyboard permits insertion not only of the meter reading but appropriate coded information such as the trainee's employee number, the route number and the like numerical information.

The numerical keys are also assigned limited functions in associated with alpha character keys of the upper section provide entry of A through Z for encoding and encoded messages. The keys also provide for the various controls and selections provided in the particular program such as initial turn-on responding to the "prompt" order and questions displayed on the monitor, request for statistical presentation of a completed program, exiting of the computer system, requesting or returning to the "menu" screen changing the meter dial display time and the like. For example, one system the upper "D" key was programmed to permit control of the dial display from that of FIGS. 2–5 to that of FIGS. 2–8 wherein the value numbers have been removed. In still another display, the number lines or marks may be removed. The period (.) key in the lower numeric system was used to clear a dial entry and allow the user to enter a new number for example. Finally, to receive a record the shift key and the number 9 and s key of the numeric section were used in conjunction to provide a result display to the user as presently described.

Figure 2:
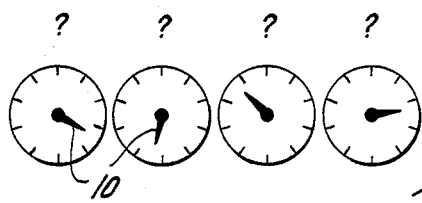
FIGS. 2–5 are a series of dial presentations, each of which is a simplified illustration of a typical mutual gas or electric meter and presented in executing the training program in accordance with the present invention.
Figure 3:
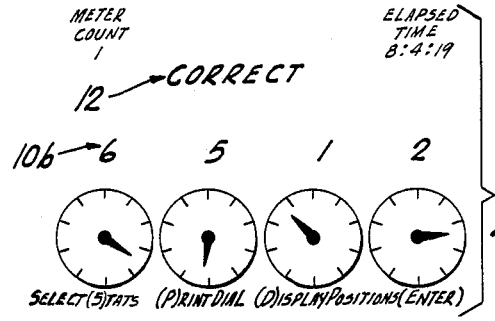
Figure 7:
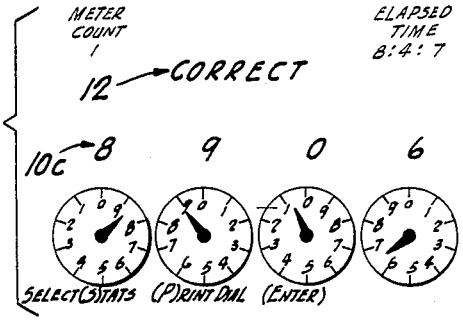

Referring particularly to FIGS. 2 and 3, a series of random displays are illustrated in each figure which are sequentially presented as by a reading points 10 and which will permit the user to select appropriate readings and through appropriate monitoring and analysis establish a readout on the screen 2, as to the effectiveness and accuracy of the reading by the operating personnel. Optionally, a separate printer 9 may also be provided to printout the various displays.

The training program is constructed to permit the trainee to control the sequence and operation from either the keyboard and preferably the hand-held meter reader instrument.

Although the system may be operated with a keyboard or the instrument, the latter instrument use is of course desirable in the introduction of the dial readings and the like because the trainee practices the reading of the dials with the identical instrument to be used in the field, and reference is made to the instrument in the following description. The instrument 8 includes an alpha-numeric keyboard 11 in a lower housing and a reading display unit 12 in an upper housing. The display 12 generally provides a readout customer and reader information and necessary related data to prompt the reader and to record a reading as inputted by the meter reader. Thus, the display may include reader's route, the meter member, the time and day of the readings, special notice of meter location, locked access to the meter and the like. As the reader inputs the reading, the reading may be displayed for purposes of checking the accuracy of the input. The hand-held instrument 8 for use with the present invention is specially programmed for interfacing with the training computer or microprocessor 1 for receiving "prompt" information form the training program and for inputting information by the trainee through the instrument, such that the system constitutes a route sinulator for "field" training of the trainee.

The dial reading program in which the dials are displayed is as follows. The program as established provides for receiving information from the trainee to establish and maintain a separate record of the training performance, and for successive training sessions, the trainee's progress. Thus, a separate receiving disk is preferably provided for each trainee.

The initial information placed in the record car provide the employee's name, employee number as well as date and time of the session and the company billing rater per unit of usage. The trainee is then prompted to respond yes or no. A "no" indicates the trainee has some question and the program may then lead the trainee through each step of the sign-on sequence. A "yes" will create the next step of the program and provide a "menu" of the available programs such as:

Training Operations

| 1. | Level 1 - Training |
| 2. | Level 2 - Training |
| 3. | Level 3 - Training |
| 4. | Practice Drill |
| 5. | Practice (0-9) |
| 6. | Error Replay |
| 7. | Print Error Report |
| 8. | Print Training Record |
| 9. | Progress Chart | with a request for entry of the option number. The first 3 options are different training levels, primarily related to the type of dial display. For example, the dials may be displayed with or without numbers, simple similar marks at the location for each number or a deal without any number or number marks. Error replays permits selection and replay of any particular reading, while options 7 through 9 permit printout of the statistical results of the trainee's results.

The system may also be programmed to provide either a "test" sequence or a "practice" sequence. In a test, the trainee would complete the sequence and receive a statistical readout. In a practice sequence, each reading is identified immediately as correct or error, and the erroneous location(s) identified.

The system also permits reading and comparing of meter numbers. In this mode, the program will signal an "error" if either the reading inserted or the reading of the meter number is in error.

In any of the above modes or sequences, a sequence of dial groups is presented on the screen for a limited time during which the training is to respond with an appropriate reading.

FIG. 2 illustrates one typical four dial reading. The display consists of the four dials 3, 4, 5 and 6 which simulate the reading dials of a conventional meter. The four dials of an actual meter are interconnected through a coupling mechanism to define four significant number positions of a decimal number, with the least significant number shown to the right-most dial 6, the next significant position dial 5 shown to the left and so forth for dials 3 and 4 in accordance with conventional practice. Each of the dials reads in tenth's and includes the digits 0 and 9 equicircumferentially displaced about the circular dial presentation. A rotating pointer 10 on each dial is driven in accordance with the four. In each instance, the digit 0 is at the normal twelve o'clock position. The least significant digit or position dial locates the digits 0 through 9 equicircumferentially spaced in the clockwise direction. The next significant digit dial 5 locates the corresponding digits 0-9 in the counterclockwise direction for the twelve o'clock "0" digit. The third significant number position again presents the digits 0-9 in a clockwise position and the fourth or most significant number position spaces the digits 0-9 in the counterclockwise direction. In a meter, the mechanical coupling of the dials 3-6 is such that the complete 360° rotation of the readout pointer or element 9 on a lesser significant number dial, moves the next greater significant number dial forward by an integer of one.

In reading the dial, the number of the least significant digit must be directly read by estimating of the relative position between the two digits. The volume between the two reading is relatively insignificant and any error correspondingly of a minor and inconsequented nature.

In executing a development program, the programmed processor 1 is operable to establish a series of different dial readouts. The readout is first presented as in FIG. 2, with each dial having the pointer 10 at a programmed setting and a question mark "?" displayed over each dial as at 10a in FIG. 2. The user inserts the digits for each dial 3, 4, 5 and 6, either from the keyboard or from the hand-held meter reader instrument, and the selected or inserted number appears in place of the question mark 10b, as at 10c in FIG. 3.

The standard computer keyboard 7, as more clearly shown in FIG. 1b, includes three basic sections including a function key section 7a, a numeric section 7b, generally arranged in accordance with a conventional calculator, and an alpha and correction section 7c which is essentially the same as a typewriter keyboard. In the system wherein the keyboard 7 is used, the calculator section is used for numerical inserts. The function section establishes movement within the system and may for example be with the following:

| | | |
|---|---|---|
| F1 | Allows you to exit the system. | |
| F2 | Returns you to the "SIGN-ON" screen. | |
| F3 | Returns you to the "MENU" screen. | |
| F7 | Decreases Scale Number in Level 1 - Training for Demand Scales. | |
| F8 | Increases Scale Number in Level 1 - Training for Demand Scales. | |
| F9 | Decreases time meter is displayed on the screen in "PRACTICE DRILL" options. | |
| E10 | Increases time meter is displayed on the screen in "PRACTICE DRILL" options. | |

The function keys are used for the basic selection of the system operation in both use of keyboard 7 or instrument 8 by the trainee of responding during a training session or sequence. As noted above, the function keys provide for leaving a program, change the speed of presentation, modify the dial configuration, and similar functions which may be provided. The alpha and correction section is used to insert names and the like as well as provides for changes in the key inserted data.

The use of the standard meter reader instrument or device 7 in training for proper reading of the dials and the like of such systems provides an input device with which the meter reader is familiar and comfortable as well as providing a more direct and efficient training. Thus, the device 7, as shown in FIG. 1a, has the standard meter keys 8a identified and which is used with a special overlay for operations of the instrument as a training input device. The information is presented to the user during the program presentation such that the instrument used for training is in the same format as in actual use.

Referring again to the execution of the program, in the least significant position of FIGS. 2 and 3, the pointer has moved past six, but has not reached seven. The reader can readily accept the number six because the pointer 10 has not reached seven. The second significant position dial 5 is shown with the pointer 9 located between the 0 and the 1. The digits 0–9 are spaced in a clockwise direction. The reader should read the digit 0, even if the pointer 10 is close to or even at the digit 1, because the lesser significant dial 6 has not made the complete revolution.

The third significant position dial has the pointer 10 on or close to digit 9. The question is whether or not the digit to be read is 9 or 8. The second lesser significant digit dial 5 should inform the reader that the proper digit is 9. Thus, the preceding lesser significant digit dial 5 has moved past 0 and is approaching 1. This indicates that the lesser significant dial has just completed a revolution and this next position dial 4 should have move from the significant digit number 8 to 9.

Similarly, the last or most significant number dial 3 has the pointer 10 between the number nine and 0. In this instance, the preceding dial 4 which rotates in a clockwise direction has a pointer at 9 and approaching 0. Therefore, the most significant dial has not reached its number 9, but is rapidly approaching it and the correct answer is 9. Assuming that the user has indicated the proper number selection 8, 9, 0, 6, the microprocessor automatically presents a display of the correct number with the legend word "correct", as at 12.

The user, after inserting a digit for each dial, actuates the processor keyboard "entry" key of the instrument 8 and therefore the computer enters the number selection and establishes a display, as shown in the second display of FIG. 3.

In addition, the display may include a number display 14 for the particular meter count in sequency of the program; that is, the particular number of the displayed dial group in the series of displays to be presented in the program. Other additional information will also be presented, such as the elapsed time display 15 which sets forth the time the operator has taken to execute the program to that point. If the display as shown in the top of FIG. 2 is a first dial display, the elapsed time should be "0" or be a relatively short period between the presentation and the entry of the answer.

Figure 4:
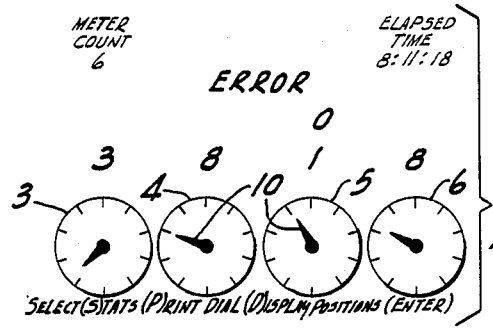

Upon review of the displayed answer, the operator should automatically select the "print" entry to bring forth a new dial group presentation, such as the second illustration in FIG. 4.

As in the just-described sequence, the dials 3, 4, 5 and 6 are presented, with each dial pointer 10 in an appropriate position for the new meter reading. The meter count would be presented, identifying which particular presentation was being made. The user again selects the numerical reading for the four dials which appears in the same location 11. Assume he has selected the reading 3688, as shown. The operator pushes the "entry" key to provide for the proper computer analysis of the number entered and the correct number. In this instance, the digit 6 was selected by the operator for the second most significant dial 4. In fact, such is in error. The proper answer is the digit 5. This should have been indicated to the operator by the fact that the next lesser significant reading dial 5 had the pointer 10 moving in the proper counterclockwise direction and had moved past the 8 digit and was approaching the 9 digit. The pointer 10 of such lesser significant dial 5 had not therefore completed a revolution. This further indicated that the movement of the next most significant digit dial 4 was in fact just short of the next most significant digit number on the dial, even though the tolerances wear or the like resulted in a pointer location on the dial which may have appeared the pointer had not reached the digit 6. A careful reading of the meter dials 3, 4, 5 and 6 may have indicated the proper answer to the meter reader of ordinary skill. However, a meter reader has a number of readings to make and must provide an efficient reading of the numbers to maintain the desired economical functioning and operation, and such errors will occur. The system is designed to minimize all such errors.

The programmed processor 1 continues to present the dials until the operator introduces a full complement of digits and then upon striking the proper "entry" key for all four dials specially displays those locations at which an error has occurred, if any. In the illustrated embodiment, the "error" is presented on the display by placing the correct digit "5" immediately above the erroneously readout selected digit "6" for dial 4, as at 13 in FIG. 4. The legend "error" is also displayed. Simultaneously, the meter count and the accumulated elapsed time is presented. Additional dial readout illustration is shown in FIG. 5, illustrating an additional error reading and the result display.

Figure 5:
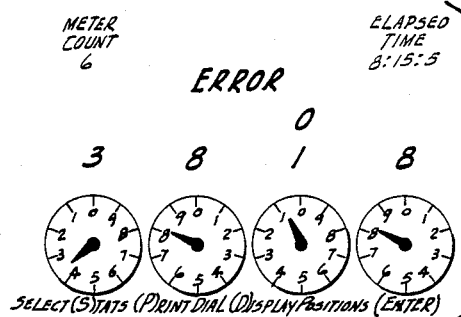
Figure 9:
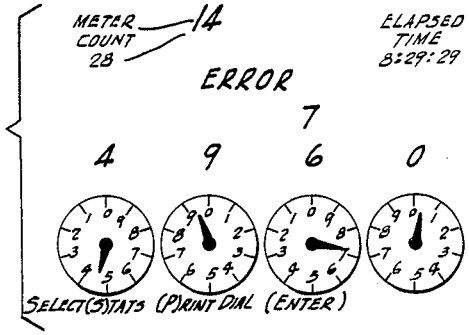

Assuming that the program included 28 different meter presentations and the last presentation was shown in FIG. 5, the meter count 14 would so indicate that the 28th meter presentation had been completed in the total elapsed time of 8 minutes and 29 seconds for reading of all 50 meters. The total execution of the program is summarized within appropriate memory of the unit computer. For example, in a preferred construction, the system will record the total number of meters read, the number of errors, the percentage that number represents of the total, as well as the total elapsed time. Such information can of course be either displayed on the display or printed out on a suitable paper by a printer.

METER READING DEVELOPMENT STANDARD FOR DIAL PROGRAM

Statistics

| Meters Read | Errors | Error % | Elapsed Time |
| --- | --- | --- | --- |
| 50 | 4 | 8% | 0:4:02 |

When using the hand held instrument 8, the user actuates the shift key and the 9/s numeric key and the statistics appear in the display 2.

The processor can be be programmed to provide additional training. For example, in addition to the standard 4 dial presentation in which the dials appear as on the commercial meters, other programmed presentations may be made for experienced readers.

Figure 6:
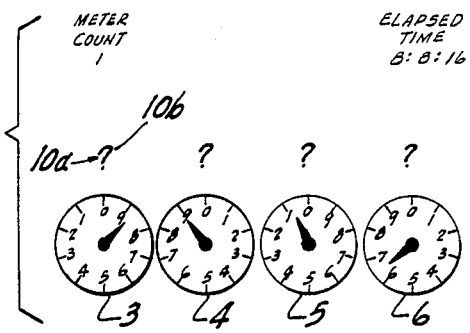
FIGS. 6–9 are a view similar to FIGS. 2–5 illustrating an alternate sequence of dial presentation for more experienced personnel.

For example, as shown in FIGS. 5-9, inclusive, a four dial positional reading program may be presented which is similar to the above described standard four dial, except that each dial 3, 4, 5 and 6 is now presented without the numeric values appearing on the dials adjacent the usual number radial line indicator. Thus, as shown in FIG. 6, a series of meter reading presentations will be made with a question mark 10b above each dial, exactly as in the standard four dial program. In this instance, however, the reader must rely on his recognition of the dial number positions and the interrelationship of the several dial pointers 10 to provide the desired proper selection. Thus, in the first presentation of FIGS. 6 and 7, the operator selects the reading of 6512. This is correct. The number appears on the display at 10b and the legend correct appears at 12.

Figure 8:
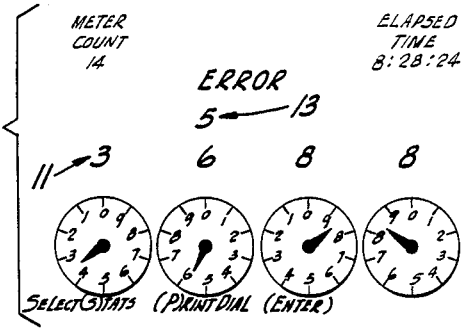

The second dial presentation in this program is shown in FIG. 8 and the inserted numbers 3818 is in error at dial 5. Thus, the pointer 10 of dial 5 has not reached the number 1 and the proper digit is 0. This should also be clear to the dial reader because the least significant digit is the digit 8. This indicates that the pointer 10 of the next significant position dial 5 is just approaching its next significant digit; namely, in the illustrated embodiment of the invention, the pointer 10 of the dial 5 is moving from 0 to 1, it is approaching the digit 1. In fact, if the second significant position dial 5 had the pointer at or just past 1, the dial 6 would be past the 0 digit position.

As in the first program, the display 2 will automatically present the correct digit 0 above the erroneous digit 1 in alignment with dial 5 and simultaneously present the "error" legend or message at 12. Similar additional displays will be made with the corresponding presentation of the operator's selection as shown in the display.

The error printout may in addition to presenting the statistics shown in the display may also present to the operator a monetary value associated with the erroneous readings, based on a given dollar factor. The "over" and "under" charges may be shown at a current billing rate.

Thus, the report is preferably in the following format:

METER-PRO
ERROR REPORT

Date: 12-12-1984
Training Option: 3 1

| Error # | Corrections | | | | Meter # | Amount | |
| --- | --- | --- | --- | --- | --- | --- | --- |
| 1 | 0 | 4 | 0 | 0 | 1 | $ 248.32 | Under |
|   |   |   | 3 | 8 | 8 |   |   |
| 2 | 0 | 6 | 2 | 8 | 8 | 3 | 64.00 Over |
|   |   |   | 1 |   |   |   |   |
| 3 | 0 | 5 | 5 | 5 | 5 | 4 | 2,197.12 Over |
|   |   | 2 | 1 | 2 | 2 |   |   |
|   |   |   |   |   |   | $ 248.32 | Under |
|   |   |   |   |   |   | $2,261.12 | Over |

STATISTICS

Total Meters ................. 4
Total Errors ................. 3
Error Percent ................ 75%
Elapsed Time ............... 0:03:21

The report thus includes the type of program, an error report, with the date and time taken to execute the program. Then, in appropriate columns, all error readings are listed with the selected reading given for each erroneous reading and a correction digit located with and aligned with the corresponding erronous digit as in the programmed presentation.

The number of meters presented during the program is listed. Finally, the error, and whether an "under" or "over" reading resulted, is listed for each particular erroneous reading. If a larger number should have been presented, the error would be indicated as an "under" reading and therefore an under dollar amount. Conversely, if an erroneously larger number was read, the error amount would of course correspondingly appear and an indication that an overage was charged. The total "over" and "under" reading is summarized to give a net monetary error amount.

This will provide the operator with a record of the status of his skill and the type of error which was created. The program will also impress upon the importance of operator accuracy in reading and reporting.

In a final high speed reading option, the multiple dial display is made with circumferentially divided dials for each readout in response to operator entry. Thus, the presentation would be as in FIGS. 2 and 3, but without the correct digit display 13 from an erroneous selection and without a legend 12 or 13. Each reading will be recorded but no error analysis or presentations will be made. Errors will be recorded only internally. The more experienced personnel can thus proceed through the sequence of reading of a plurality of meters at a rapid rate and without stopping to verify or confirm the selection and entries. At the end of the high speed program, the final statistics will be presented, and at that time, particular errors, if any, will be presented. The actual meter displays can of course be called back through appropriate actuation of the processor in the event the operator has any question with respect to any error printout.

The personnel executing the program can of course read the meters either from right to left, or left to right in the same manner he has the option in actual practice to read the meters.

The selection of the reading option can be selected by the operator. In a practical embodiment, the programmed device includes the means for establishing the several sequences of operations on options. At the beginning of the program, the several options are presented for selection by the operator reader. The selected program is then established under the above described control of the operator/reader. Under each option, meter outputs, with or without the number digits on the display, are sequentially presented to the operator/reader, under the operator control. The operator selection, with or without error identification superimposed on the operator selection, is displayed and presented for each dial readout presentation. The skill of the operator is recorded by storing of the errors, including the character of the error, and presenting the stimulating and development feedback information instantaneously and on a statistical basis for evaluation by the operator/reader.

Further, the system is preferably specially constructed to permit a mixed dial category during a training session. Thus, commercially some meters have 4 dials while others have 5. In order to properly train readers, the mixed dial category permits a random selection of 4 and 5 dials displayed in a given training session. This permits a further significant and enhanced training program.

The monitor 2 of the computerized training unit may be operated with various level of resolution. A high resolution presentation with the usual personal computer is 640×400 pixel. Such high resolution presentation however requires a special circuit board or card to process the graphic signals. Further, different level of colors are available with certain graphic systems. Generally, multiple color systems require special graphic boards and appropriate computer hardware to accept the board. Further, in the high resolution displays, the screen presentation may include a slight flicker which may be disturbing and considered unacceptable for training apparatus. The training system is readily adapted to low resolution monitor with a 320×200 resolution wherein the graphics is presented by horizontal bars producing a somewhat jagged edge to the graphic symbols. However, the presentation is distinct and steady, and generally readily acceptable. Further, the lower resolution monitor permits use of various standard graphic systems in personal computers and particularly the IBM and IBM compatible graphic processors. Generally, the prior high resolution color adapted system was developed with a special graphic color card manufactured and sold by Teemar. The low resolution system provides a highly effective system with a faster overall system performance.

The computer is also preferably programmed such that the user can develop a route training sequence or script for the particulars of a route reading system in which various levels of detailed information of the task to be performed during covering a route are set forth in order to assist the trainee during the training program. Thus, a series of script may be developed for any utility or other user, and each utility can directly tailor the script to its particular problems, equipment and route reading system. The script may of course be a basic simple script which merely provides for sequence reading of a series of meters with appropriate route identification and instruction for entering of basic identifying information. Generally, the programs will also provide for the various problems and difficulties which the reader encounters in the field under actual working and reading conditions. For example, the program may provide various encodable problem information to be entered, such as a broken meter, a "can't-get-in", access key location and the like. The script can be directly written using the hand-held instrument, with the flexibility in essence only limited by the keyboard inputs for the particular instrument and the related programming of the instrument. The trainee would then use the same type of instrument for entering the appropriate code to record such problem, in the same manner as the trainee would upon encountering such a problem in the field, as well as the standard meter reading information.

The present invention has been found to provide a simple reliable and effective method of improving the reading accuracy of personnel. The reader personnel operates the system directly, thereby minimizing the required time and effort of associated personnel. The cost of course is also correspondingly reduced. Actual demonstration and use of the system during the development of the system has shown that personnel who have been trained verbally or otherwise and still had an unacceptable error rate, were rapidly trained with the present apparatus and method to produce highly satisfactory reading accuracy. In addition, the accuracy of the experienced and reliable personnel was increased significantly as the result of review with the present apparatus and method. The present invention provides a readily acceptable and effective training system, while establishing necessary documentation on the progress of the readers and all without significant direct supervision.

A program listing for one program of presenting the dials and receiving an input with automatic recording is submitted herewith to be made a part of the file wrapper.

Various modes of carrying out the invention are contemplated as being within the scope of the following claims particularly pointing out and distinctly claiming the subject matter which is regarded as the invention.

I claim:

1. A dial reading development apparatus comprising a display means including means for generating a multiple of circular numeric reading dials one for each digit in a number and organized in side-by-side relation and simulating a quantative dial readout of a quantative meter number including a series of adjacent lesser significant digit number positions, each of said dial presentations being divided into ten equal segments, marking means on each of said dials located with respect to said segments and in cooperation therewith identifying a corresponding digit to a nearest whole digit, the whole digit being directly related to and controlled by the preceding digit of the adjacent dial including the lesser significant digit, a processor means connected to said display means and including programmed means, said programmed means sequentially presenting said dials with different readout numbers, a hand-held standard meter reading device coupled to said processor means and having digit input means connected to said processor means and operable to manually receive any one of the whole digits in accordance with a reading of the marking means and thereby to manually insert the whole digit for each of said dials into said processor means, said programmed means recording the inserted digits and comparing said digits with the correct digits establishing by said marking means, and output means coupled to said processor, said programmed means outputting the error and the identification of the digits to said display means.

2. The apparatus of claim 1 wherein said display means displays the selected digit above each dial and said programmed means establishes the correct digit next to a selected erroneous digit only for each erroneous digit.

3. The apparatus of claim 1 including a processor keyboard input means connected to said processor means for establishing the presentation of the dials on the display means.

4. The apparatus of claim 1 wherein said dials include non-numeric equi-spaced markings defining said ten equal segments on the dial and said marking means including a rotating cooperative marking member for establishing the readout of each dial.

5. The apparatus of claim 1 wherein said programmed means is operable to selectively supply a first series of said dial readouts with identifying number digits 0-9 on said markings and a second series of said dial readouts with said identifying number digits blanked.

6. The apparatus of claim 1 wherein said hand-held meter reading device includes keys operable to read commercially distributed meters and further includes special indicia for inserting of proper keystrokes into said means for generating said reading dials in said display means.

7. The apparatus of claim 1 wherein said dials are randomly presented in sets of at least four dials.

8. A dial reading development apparatus, comprising a video display means having a resolution on the order of 320×200 for establishing an essentially limited black and white display, said display means including means for generating a multiple of circular numeric reading dials one for each digit in a number and organized in side-by-side relation and simulating a quantative dial readout of a quantative meter number including a series of adjacent lesser significant digit number positions, each of said dial presentations being divided into ten equal segments, marking means on each of said dials located with respect to said segments and in cooperation therewith identifying a corresponding digit number to a nearest whole digit, the whole digit number being directly related to and controlled by the digit of the adjacent dial including the lesser significant digit, a processor connected to said display means and including programmed means, said programmed means sequentially presenting said dials with different readout numbers, a hand held standard meter reading device connected to said processor means and operable to manually receive any one of the whole digits in accordance with a reading of the marking means and thereby to manually insert the whole digit for each of said dials into said processor means, said programmed means recording the inserted digits and comparing said digits with the correct digits established by said marking means, and output means coupled to said processor, programmed means outputting the error and the identification of the digits to said display means.

9. The apparatus of claim 1 wherein said display means establishes a display of the selected digit above each dial and said programmed means establishes the correct digit next to a selected erroneous digit only for each erroneous digit.

* * * * *